United States Patent [19]

Sundermann et al.

[11] Patent Number: 4,752,359

[45] Date of Patent: Jun. 21, 1988

[54] METHOD OF PRODUCING ACTIVE FORM COKE

[75] Inventors: Erich Sundermann; Hanno Laurien, both of Brunswick; Hans Reye, Neustadt, all of Fed. Rep. of Germany

[73] Assignee: Perfluktiv Technik AG, Zug, Switzerland

[21] Appl. No.: 810,282

[22] PCT Filed: Mar. 16, 1985

[86] PCT No.: PCT/EP85/00113

§ 371 Date: Jan. 9, 1986

§ 102(e) Date: Jan. 9, 1986

[87] PCT Pub. No.: WO85/04388

PCT Pub. Date: Oct. 10, 1985

[30] Foreign Application Priority Data

Mar. 24, 1984 [DE] Fed. Rep. of Germany ....... 3410893

[51] Int. Cl.⁴ ...................... C10B 49/02; C10B 53/08
[52] U.S. Cl. ........................................... 201/6; 34/172; 201/17; 201/34; 201/38; 202/99; 414/199; 422/311
[58] Field of Search ................ 201/6, 17, 26, 27, 29, 201/34, 37, 38, 39, 44, 21; 202/99, 104, 108, 117, 121, 262, 270; 34/172, 194, 237, 167, 168; 414/153, 169, 199, 200, 209; 422/311; 423/449; 502/418, 432, 437; 432/13, 14, 98

[56] References Cited

U.S. PATENT DOCUMENTS

| | | | |
|---|---|---|---|
| 1,326,909 | 1/1920 | Brons | 34/237 |
| 1,834,497 | 12/1931 | Oxer | 34/172 |
| 3,149,976 | 9/1964 | Smith | 34/172 |
| 3,663,421 | 5/1972 | Parr | 201/34 |

FOREIGN PATENT DOCUMENTS

| | | |
|---|---|---|
| 605027 | 11/1934 | Fed. Rep. of Germany. |
| 607786 | 1/1935 | Fed. Rep. of Germany. |
| 848172 | 9/1952 | Fed. Rep. of Germany. |
| 1243827 | 7/1967 | Fed. Rep. of Germany. |
| 2507735 | 9/1976 | Fed. Rep. of Germany. |
| 594171 | 9/1925 | France. |
| 610042 | 8/1926 | France. |
| 784139 | 7/1935 | France. |
| 1139777 | 7/1957 | France. |
| 157194 | 8/1922 | United Kingdom. |

Primary Examiner—Barry S. Richman
Assistant Examiner—Joye L. Woodard
Attorney, Agent, or Firm—Karl F. Ross; Herbert Dubno

[57] ABSTRACT

Active form coke is made from coal by passing the coal granulate downwardly through a preheating and pyrolysis zone, a heating zone, an aftertreatment zone and a cooling zone by moving respective grate bars of grates in each zone so that a bed of granules on one grate trickles uniformly onto the next lower grate. In the preheating, heating and aftertreatment zone $CO_2$ or steam are passed through the beds by laterally introducing the gas at one side and withdrawing the gas on the opposite side of a respective bed.

11 Claims, 5 Drawing Sheets

METHOD OF PRODUCING ACTIVE FORM COKE

CROSS REFERENCE TO RELATED APPLICATION

This application is a national phase application of PCT/EP 85/00113 filed 16 Mar. 1985 and based, in turn, upon a German national application No. P 34 10 893.9 filed 24 Mar. 1984 under the International Convention.

FIELD OF THE INVENTION

The invention relates to a process and an apparatus for the manufacture of activated coke in the form of a granulate based on pretreated black coal in which pre-molded granulates are passed through different treatment zones of a shaft and in the zones are pyrolyzed by means of laterally introduced and withdrawn gases or vapors, heated, activated with steam or $CO_2$ gas or a mixture of steam or $CO_2$ gas and post-treated and cooled.

BACKGROUND OF THE INVENTION

It is known to manufacture activated form coke from pretreated black coal material in the form of a granulate or a particulate product, the black coal being powdered and made into a paste with a binder and transformed into granulates which are subsequently pyrolyzed and activated, thereby yielding a corresponding particulate or granulated product.

When pretreating the black coal it is possible in addition to precede the powdering by a de-ashing or extraction or oxidation step.

Known binders for converting the powdered black coal into a paste include, black coal tar and wood tar, inorganic gels such as silica gel and iron or aluminum hydroxide, optionally in combination with neutralizing substances such as caustic soda or lime.

It is also known for the manufacture of activated coke to convey the pretreated products intended for that purpose through a shaft which comprises the aforementioned various treatment zones, in which the pyrolysis, heating and activating takes place by laterally introduced and discharged gases or vapors.

In the known process, the material to be treated and which is conveyed through the shaft is rerouted repeatedly in opposite directions in the form of a column of material for the attainment of increased reaction areas and an effective mixing of the reagents, the gases or vapours passing therethrough in a direction transversely to the columns.

In another embodiment the material to be treated is passed through sleeve-shaped internal structures overlapping each other and centrally passing through the shaft from the top downwards and the material column is subjected to a flow therethrough of the treatment gases which are introduced sideways.

The known processes for attaining the required thermal and material exchange require relatively long residence periods the individual zones, in particularly if the flow through the column of material proceeds vertically whereby the energy consumption for effecting the flow and for transferring the heat is increased.

Moreover, an uneven treatment of the material particles contained in the material column results from the pronounced flow profile.

Finally, substantial abrasion losses take place even during the manufacture of the activated coke, because the material particles in the lower region of the material column are subjected to the static pressure of the material load and accordingly high frictional forces in relation to adjoining material particles or the internal structures in the shaft are unavoidable.

SUMMARY OF THE INVENTION

In accordance with the present invention granulates of uniform dimensions having longitudinal and transverse dimensions or a diameter of 6 to 25 mm are molded and are provided in plane shallow beds adapted to the shaft cross section and of uniform bed thickness across the cross section.

Each bed is supported in the shaft by grids at different levels one above the other, leaving free interspaces, and after predetermined residence periods in the individual stages are conveyed through the shaft from the top to the bottom, starting with the lowermost bed, through the discharge means thereof, the beds during the periods of resistance on the grids in the treatment zones being subjected to a flow therethrough of the gases or vapours.

The gases or vapors are introduced into the free interspaces between adjoining beds and are discharged from other interspaces on the opposite side of the bed from that in which they were introduced.

The flow through each bed is normal to the plane of the bed, and the beds after the respective periods of residence on the individual grids are disrupted by removal of at least some the grid rods being removed at controlled times from the plane of the grid, the granulates thereby being transferred in the form of a uniform free flow onto the respective next lower grid in such a manner that once again beds are formed having uniform bed thicknesses across their entire cross sections.

Due to the use of granulates of uniform sizes approximately uniform interstitial voids are formed in the individual beds, a factor of particular importance in the context of the flow of the gases or vapors through the beds in the individual treatment zones.

In combination with the shallow beds having uniform bed thicknesses over their entire cross section there is over the entire cross sectional area of the beds, an approximately uniform flow resistance such that when the beds are exposed to a uniform input flow, there will be a uniform flow through the beds.

The uniform input flow to the individual beds in the region where the gases or vapors are introduced into the shaft is attained by feeding the gases or vapors into the free interspaces between the respective adjoining beds.

If the gases or vapors flow through several beds one above the other, any unevenness of the flow, e.g. locally differing flow velocities or local differences in pressure of the gases or vapors emerging from the preceding bed will be compensated for in such a manner that such irregularities cannot adversely affect the entire flow path of the gases, until they are discharged.

In view of the uniform treatment of all granulates and in view of the intensive flow through the interstices and simultaneous turbulence of the gases in the interstices, the surfaces of the granules are exposed repeatedly to fresh gas molecules so that a very intensive thermal and material exchange is attained, resulting in a substantial decrease in the reaction period.

The subdivision of the material composed of the granulate to be treated into shallow and plane beds spaced apart from one another moreover ensures that the granules at no stage of their treatment will be subjected to excessive static pressure which might result in the undesirable abrasion effects.

However, it is important that the beds on their way through the treatment zones maintain a uniform bed thickness. By the controlled withdrawal of at least some of the grid rods from the respective grid plane the bed maintained on the grid rods is caused to break up, the controlled movement of the grid rods serving to attain the desired uniform trickle flow and the formation on the next following grid of a bed once again having a bed thickness which is uniform over the cross section.

Appropriate preliminary trickle experiments may serve to determine as a function of the shape and size of the material particles the most advantageous pattern of movement of the grid rods, whereafter the control of the movement of the grid rods may be adjusted accordingly. The movement of the grid rods simultaneously brings about a breaking up of any bridge formations which may have arisen in the granulate. In this context provision may be made for a controlled lowering or raising of the movable grid rods as a function of time.

It is advantageous for the bed during the period of residence in the pyrolysis zone to be permeated by the pyrolysis gas in countercurrent. Accordingly the pyrolysis gas is passed through the bed in a direction opposite the direction of transport of the granulate from one grid to the next. The pyrolysis zone in this context may include a plurality of beds through which the pyrolysis gas passes successively. The pyrolysis gas generally has a temperature of about 400° C.

The countercurrent flow of the pyrolysis gas through the beds makes it possible to attain or slightly exceed a loosening threshold of the granulates in the bed by appropriate adjustment of the flow velocity of the gases, such that sintering together or cohesion of the granulates in the pyrolysis zone can be avoided substantially by an appropriate adjustment of the flow velocity of the pyrolysis gas. The flow velocity may amount up to 5 m/sec based on the free cross section of the shaft.

It is particularly advantageous for the beds during their periods of residence in the pyrolysis zone to be locally shielded partially and alternatingly against the passage therethrough of the pyrolysis gases which pass through the respective remaining regions until the loosening threshold is attained or exceeded. In this manner an alternating partial movement of the granulates in the bed or even a partial repacking from the regions through which the gas happens to flow into those regions through which no flow takes place may be attained, the local changeover of partial flow patterns repeatedly serving to attain a return to a loosened state of the previously repacked granulates.

During the treatment of the granulates it is advantageous for the flow through the beds in the heating, activation and post-treatment zone during one or more periods of residence to take place in one direction and during other periods of residence in the opposite direction so that the thermal gradient in the beds is reduced.

It is of particular advantage in accordance with a further development of the inventive concept for the beds in the cooling zone to be sprayed with water and the steam generated in the cooling zone to be passed to the bed of at least one of the preceding treatment zones. As a result, in addition to the cooling effect, a substantial part of the steam required for the preceding treatment of the granulates is obtained thereby resulting in a substantial saving of energy.

Apparatus for carrying out the process described in the aforegoing are of a type comprising a shaft having internal structures and serving for accommodating a granulate to be conveyed through the shaft, connected to means for feeding and discharging the gases and/or vapors and provided with lateral inlet and outlet apertures for such gases.

According to the invention the interior of the shaft is subdivided by grids into chambers and in the upper portion of the shaft a means for feeding preporportioned beds of granulates which each fill the chambers only partly and for uniformly distributing the granulates over the shaft cross section on the uppermost grid are provided. The grids are composed at least in part of movable grid rods having operating means and controllable drive means associated therewith for the temporary and periodically controlled increasing of the free spaces between adjoining grid rods by the withdrawal of part of the grid rods from the grid plane.

In this context it is advantageous if the apparatus for the feeding and uniform distribution of the premeasured amount of bed material comprises a slider box adapted to be moved in an inlet lock across the shaft cross section, its bottom being formed by a grid the construction of which corresponds to the grids in the shaft and being operable in the same manner.

It is furthermore advantageous if at least between adjoining grids of different treatment zones there is provided a partition formed by pivotal louver slats, adapted to be moved into the closed and open position respectively by adjustment of the slats. Such partitions may also in addition be provided in the region where the bed enters the shaft and where it leaves the shaft. Such partitions make possible, in a particularly simple manner, an aerodynamic separation of the treatment gases being passed in the individual zones through the beds and having different compositions and also different temperatures.

In order to facilitate the above described partial flow through the beds in the pyrolysis zone, it is advantageous that immediately underneath the grid in the pyrolysis zone of the shaft there is in each case provided a grid-shaped insert for the formation of parallel flow passages. Flaps pivotal about horizontal axes are provided in the flow passages which in a pattern like the squares of a chessboard are adapted to be pivoted alternatingly in group in the plane of the shaft or normal thereto. A simple design of the pivotal flaps has for each row of flaps two horizontal axes, one above the other, for the alternate arrangement and group-wise pivoting of the flaps.

Further preferred details concerning the particular design of the grids including their movable grid rods and their design in the form of structural units will be apparent from the preferred examples.

In order to be able to vary the height of the shaft according to prevailing requirements and also to permit premanufacture provision is made in accordance with an advantageous embodiment of the apparatus that the shaft is assembled from module members each forming a closed ring, including a grid and at least some of the module members comprise flow apertures, through the walls for the feeding and discharging of the gases.

In accordance with another modification of the shaft design the grids take the form of structural units adapted to be introduced by sliding sideways through the shaft walls through closable window apertures. This design offers the advantage that the grids can be replaced relatively easily when they have become unservicable or if grids having different grid rod spacings are to be used to allow for different materials in the shaft.

By leaving free interspaces between adjoining beds, it is possible that underneath the respective stationary grid rods rebates are provided in the shaft walls on the shaft inside for accommodating the operating means for the movable grid rods respectively for the structural units formed thereby and drive means for the operating means are provided outside of the shaft walls.

In order to counteract the formation of blockages of the gaps between the grid rods due to the granulates it the grid rods, viewed in cross section, in their upper portions can comprise a profile forming a waist region and can be fitted with interchangable profile members. These have advantageously horse shoe-shaped projections in the longitudinal direction of the grid rods serving as stop members for adjoining profile members. With these rider-shaped profile members, it is possible for a given spacing of the grid rods to vary the relative proportion of overall free flow areas or to provide local variations thereof for any given grid. Moreover, by using rider-shaped profile members of different cross sections, it is possible to influence even on a single grid the manner in which the trickle flow proceeds when the movable grid rods are transferred into their open positions. Accordingly, it is possible by means of the rider-shaped profile members to influence the flow through the beds as well as the formation of the trickle flow with a view to the attainment of uniformity.

Because temperatures between 400° and 950° C. prevail in the shaft, it is necessary to use appropriate thermally resistant materials for the internal structures in the shaft. It is advantageous for the grid rods as well as the remaining load-bearing parts of the grid and the grid-shaped inserts as well as the flaps held therein to be made of ceramic materials.

In order to attain the above described cooling of the lowermost bed in the shaft in a particularly effective manner and simultaneously to generate at least a portion of the steam required in the preceding treatment zones, we can provide a spray device for feeding water above at least one of the beds of the cooling zone.

BRIEF DESCRIPTION OF THE DRAWING

The drawing illustrates diagrammatically an apparatus for carrying out the process of the invention.

In the drawing.

SPECIFIC DESCRIPTION

Figure 1:
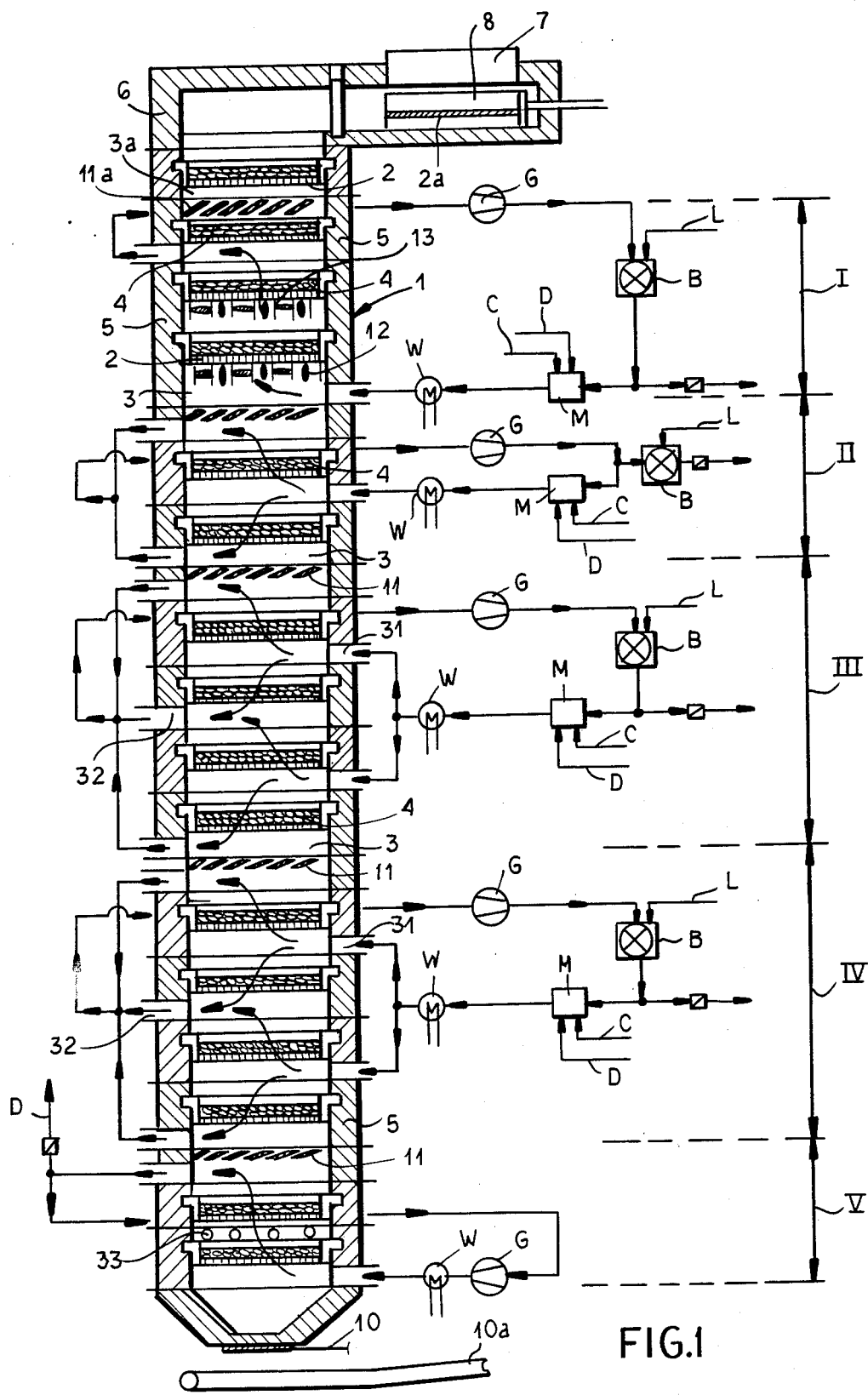
FIG. 1 is a longitudinal section through a shaft for the manufacture of activated form coke as a granulate according to the invention, diagrammatically illustrating the gas flow.

The shaft illustrated in FIG. 1 comprises a shaft wall, the whole of which is denoted as 1 and is of square or rectangular cross section. In the shaft, grids 2 are fitted in the walls is spaced apart relation one above the other, such that between adjoining grids chambers 3 are formed which are only partially filled by planar beds 4 of granulate based on pretreated black coal to be treated in the shaft for the manufacture of activated form coke, such that between any two adjoining beds 4 a free interspace remains.

In the illustrated example the shaft is assembled from closed annular module members 5 fitted one above the other, each receiving therein a grid 2, such that the shaft can be manufactured from an appropriate number of module members 5 in varying heights and with accordingly variable numbers of levels.

At its lower end the shaft comprises a discharge aperture 9 closable by a slider 10, for discharging the activated coke granulates treated in the shaft. Below the shaft a conveyor 10a for the onward conveyance of the granulates emerging from the shaft may be seen.

In an upward direction the shaft is closed by a closure casing designed in the form of an inlet lock 6. In a laterally projecting part of the closure casing 6 a metering device 7, illustrated diagrammatically, is provided in which the respective amount of pretreated granulates requird for a bed 4 is accommodated and from there is delivered to a slidable mold box 8, forming a flat bed having a uniform bed thickness over its cross section. This mould box is downwardly closed by a grid 2a corresponding to the grid 2 in the module members 5 of the shaft 1 and fitted with the same operating devices as are the grid 2 in the shaft and still to be described further below, so that after the transference of the mould box into the position above the free shaft cross section, the bed contained in the mould box 8 may be transferred onto the grid 2 upwardly limiting the uppermost chamber 3a while maintaining a uniform bed thickness over the bed cross section.

The metering device 7 may comprise a grid corresponding to the grid 2 of the mould box and an additional means for levelling the surface of the bed to be accommodated. The interior of the shaft 1, including the bed 4 contained therein can be subdivided into altogether five zones, more particularly from the top to the bottom into the zones I to V indicated on the right hand side next to FIG. 1. The uppermost zone I constitutes the pyrolysis zone. The zone II following thereon in the downward direction is the heating zone. The downwardly next following zone III is the activating zone. This is followed by the post-treatment and the cooling zone represented by zones IV and V.

In the illustrated example the aforesaid zones I to V in the interior of the shafts 1 are each separated aerodynamically by partitions 11 each formed by pivotal louver slats and adapted to be moved into the closed and open positions by movement of the slats. In FIG. 1 all slats are in the closed position such that the partitions 11 are effective.

Between the uppermost bed in the shaft and the next bed further below, a further similar partition 11a is provided which limits the pyrolysis zone I jointly with a closure bed provided undeneath the partition 11a and through which no flow passes, in respect of the particular bed newly introduced into the shaft, providing a closure in an aerodynamic sense.

Immediately underneath each of the grids of the pyrolysis zone I, grid-shaped inserts 12 can be seen combined with flaps 13 by which a partial flow through the beds contained on these grids in the pyrolysis zone I is made possible. Details of the grid-shaped inserts 12 and of the flaps 13 will be described in conjunction with FIGS. 7 to 9.

Figure 2:
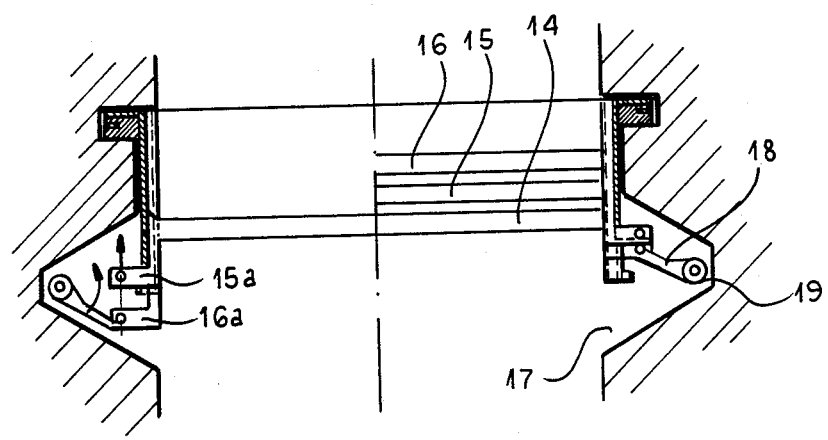
FIG. 2 is a detail view on a larger scale of a portion of the section according to FIG. 1 at the level of a grid from which details of the grid design are apparent.
Figure 3:
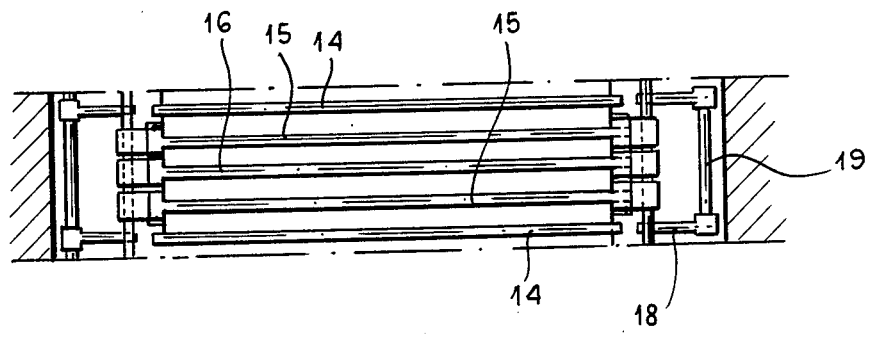
FIG. 3, is a plan view of the embodiment according to FIG. 2.
Figure 4:
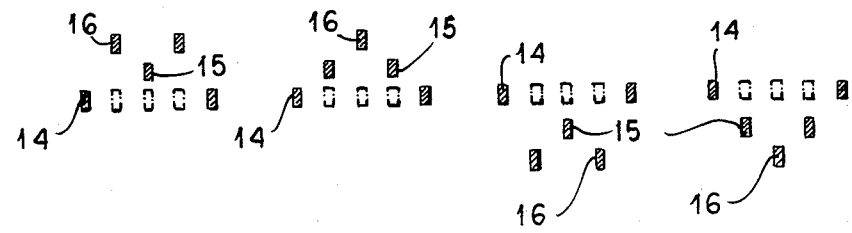
FIG. 4 is a diagram of four possible positions of the grid rods when arranged and designed in accordance with FIGS. 2 and 3.

The grids provided in the shaft 1 of FIGS. 2 to 4 are each formed in part by stationary grid rods 14 and in part by movable grid rods 15 and 16. The latter are movable upwardly from the plane of the grid in relation to the stationary grid rods 14 in order to temporarily increase the free intervals between adjoining grid rods. In FIG. 2 in the left hand part thereof, the position of the grid rods 14 to 16 in the grid plane is shown, while in the right hand part the grid rods 15 and 16 have been illustrated raised to different positions in relation to the grid plane. For raising the grid rods 15 and 16, crank or pivot arms 18 are provided in nook-shaped rebates 17 inside the shaft wall and adapted to be pivoted from the outside by way of an operating shaft 19. The movable grid rods 15 and 16 are longitudinally extended in relation to the fixed grid rods 14 and are combined in each case in a raisable or lowerable structural unit, the extensions of the grid rods 15 and 16 comprising crank arms 15a and 16a respectively of different lengths. The result is that, due to a pivoting movement of the crank arms 18 about the pivoting axis 19, the grid rods 15 and 16 are moved to different levels as can be see in the right hand half of FIG. 2.

Instead of a raising of the movable grid rods 15 and 16 it is possible as an alternative to provide for a lowering of such grid rods in such a manner that the grid rods 15 and 16 will adopt different relative positions. In FIG. 4 four modifications of such different positions of the grid rods 14 to 16 in relation to one another are illustrated, in each case the starting position of the grid rods being shown in broken lines, while the possible end positions of the grid rods are shown shaded.

Figure 5:
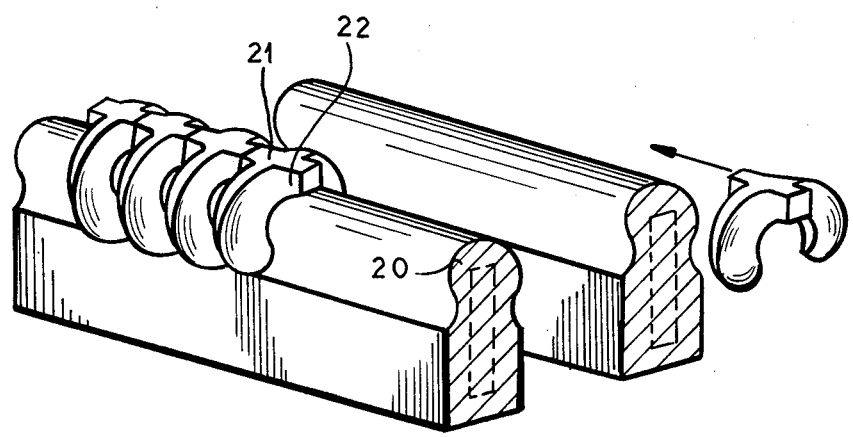
FIG. 5 is a perspective view of two grid rods showing rider-shaped profile members applied thereto.
Figure 6:
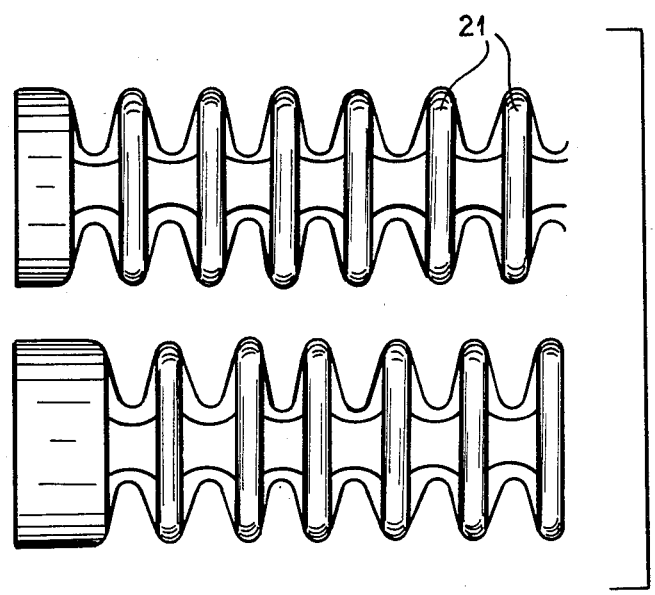
FIG. 6 is a partial plan view of two parallel grid rods according to FIG. 4 with rider-shaped profile members applied thereto.

The grid rods illustrated diagrammatically in FIGS. 2 and 3, in practice have a shape as illustrated in FIGS. 5 and 6. The grid rods may take the form of solid or hollow profile rods, the optional cavity in the case of hollow profiles being illustrated in broken lines in the shaded section surface of FIG. 5. The grid rods comprise a profile 20 having a waistline and are fitted with rider-shaped profile members 21. These rider-shaped profile members 21 which can be mounted interchangeably on the grid rods, each have a horse-shoe configuration and in the longitudinal direction of the grid rods have projections 22 serving as stops against adjoining rider-shaped profile members. When these rider-shaped profile members 21 are densely packed on the grid rods, there results for the grid rods a pattern as illustrated in plan view for two adjoining grid rods in FIG. 6. FIG. 6 also shows that in the case of adjoining grid rods the rider-shaped profile members 21 viewed in the longitudinal direction of the adjoining rods are preferably provided in staggered mutual relationship.

The rider-shaped profile members 21 have the effect that the lowermost layer of granulates in any one bed is prevented from blocking the gaps between adjoining grid rods by the granulates being forced into mutually staggered positions, such that in the lowermost layer the interstices there remaining between the granulates permit a uniform impact and inflow of the treatment gases into the beds maintained on the grids. The rider-shaped profile members 21, for any given spacing of the grid rods may have different diameters such that the proportion of free cross sectional areas through the grids may be adjusted correspondingly or may be varied overall or in places.

Figure 7:
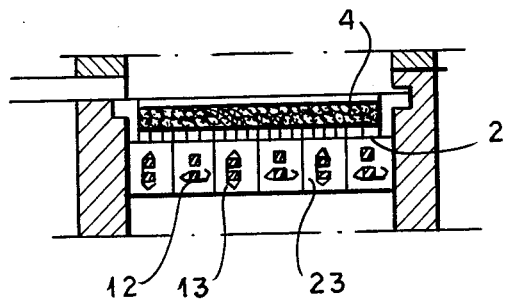
FIG. 7 is a partial longitudinal section through the shaft according to FIG. 1 in the region of a bed of the pyrolysis zone.
Figure 8:
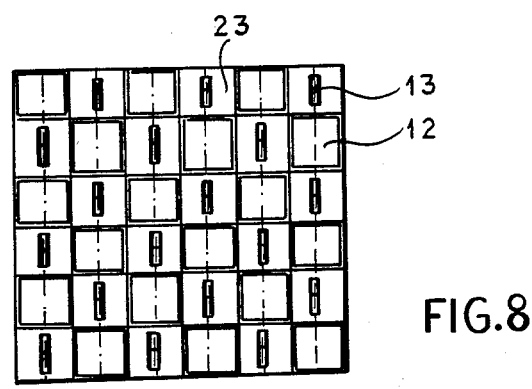
FIG. 8 is a reversed plan view against the flaps according to FIG. 7 distributed over the shaft cross section.
Figure 9:
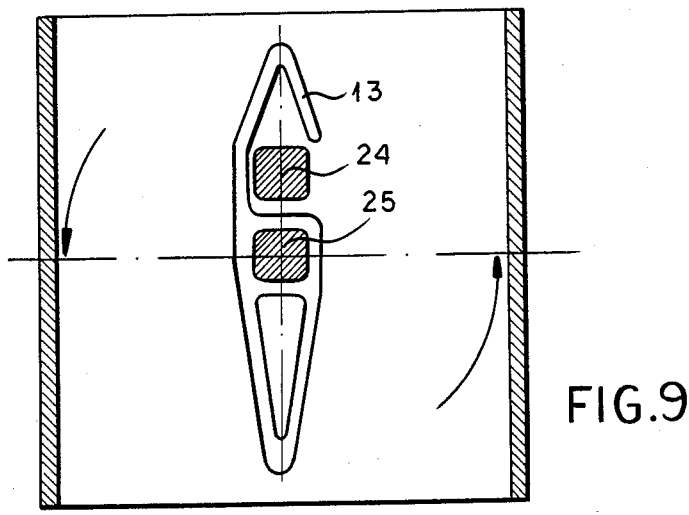
FIG. 9 is an enlarged view of a cross section through one of the flaps according to FIGS. 6 and 7.

The arrangement and design of the grid rod shaped inserts 12 and of the flaps therein provided as used in the pyrolysis zone I are apparent from FIGS. 7 to 9. Due to the grid-shaped insert 12, mutually parallel flow passages 23 are formed over the entire cross sectional area of the grid 2 or of the bed 4 in each of which one of the pivotal flaps 13 is maintained. The flaps 13 are so held in the flow passages 23 in a pattern like the squares of a chessboard that any adjoining flaps occupy different positions. In order to be able to jointly adjust the flaps 13 of equal positions of any one row, two horizontal shafts 24, 25 are arranged one above the other in accordance with FIG. 9 on which the flaps 13 of any one row are mounted alternatingly. In a working example according to FIG. 9 the flaps 13 mounted on the shaft 25 accommodate in a rebate the shaft 24 of the respectively adjoining flaps without these axes 24 interfering with the pivoting movement of the flaps 13 held on the axes 25. In this manner it is possible to move all flaps into the blocking position or all flaps into the open position or move the adjoining flaps into different positions.

Figure 10:
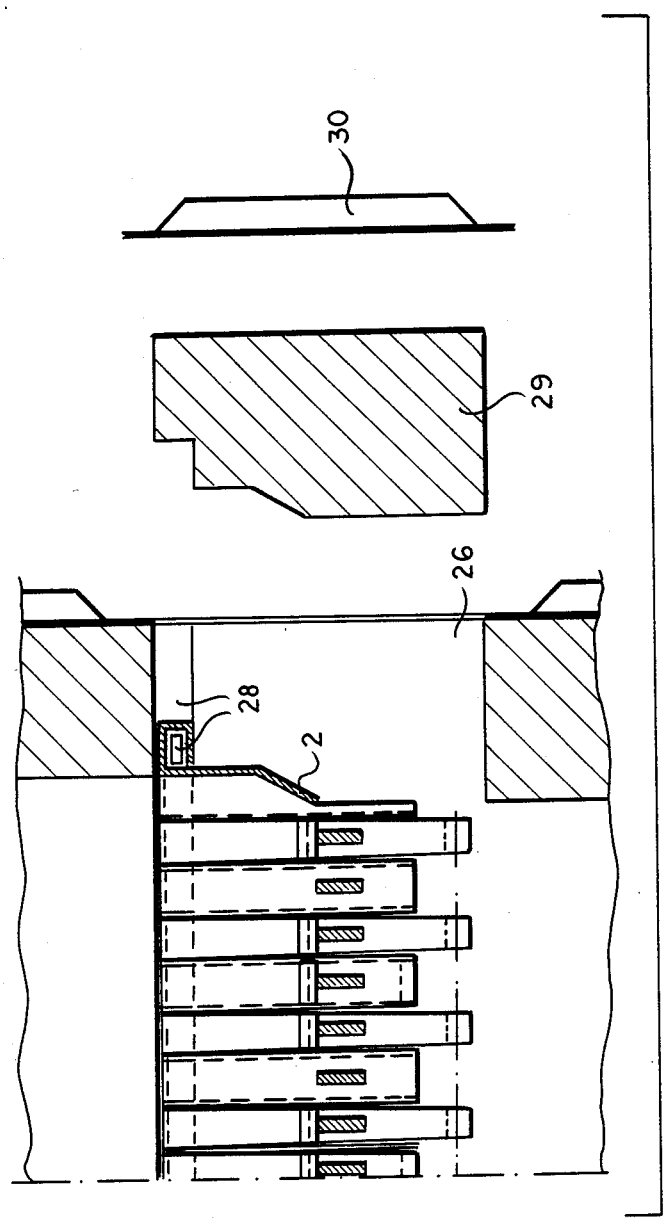
FIG. 10 is a partial longitudinal section through a shaft having laterally insertable grids.

Instead of the modular design of the shaft 1 described in conjunction with FIG. 1, the shaft wall may also be designed as a continuous wall and comprise window apertures in accordance with the example of FIG. 10, through which the grids 2 are laterally insertable in the form of the abovementioned structural units.

In this context the grids 2 are held in groove-like rebates 27 of the lateral shaft walls by way of mounting means 28. For closing the window apertures 26 in the shaft wall a filler member 25 of matching configuration is provided in conjunction with a cover plate 30 which after the insertion of the filler member 29 can be screwed to the shaft wall. By the aforesaid design it is possible to replace at low cost and at short notice the grids 2 provided in the form of structural units.

In the following an example of the process according to the invention will be described with reference to FIG. 1. For that purpose a possible pattern of process gas flow for the manufacture of activated coke granulates in the illustrated shaft is illustrated diagrammatically and in a simplified fashion in FIG. 1. The various arrows represent the directions of flow of the gases or vapors.

In the example all gas feed apertures 31 are provided in the right hand wall of the shaft, while all discharge apertures 32 are provided in the left hand wall of the shaft.

In accordance with the illustrated example, separate gas circuits are provided for the zones I to IV but being of similar design. In the illustrated example a mixture of steam and $CO_2$ is used as the activating gas. It is furthermore assumed that as the inert gas for the pyrolysis zone I and for the preheating zone II and also subsequently for the post-treatment zone IV a mixture of steam and $CO_2$ serves as the inert gas.

In the individual circuits the blowers are each denoted as G, the burners in which the reaction gases respectively emerging from the shaft are subjected to post-combustion by B, the heat exchangers by W and the mixing devices in which steam and $CO_2$ are mixed with the combustion gases by M. The feedlines for the air are denoted as L, the lines for feeding the steam by D and the lines for freeing the $CO_2$ gas by C.

The drawing does not show the possible manner in which the heat exchangers W may be combined.

In the example it is assumed that the cooling of the beds prevailing in the cooling zone V takes place exclusively by spraying of a bed by means of a spray device 33 with water such that in the cooling zone, entered by the beds at a temperature of about 800° C., steam is generated, a minor part of which is circulated whist the major part is passed through the duct D emerging from the cooling zone to the circuits I to IV, such that in the illustrated example the steam required for conducting the process is generated in cooling zone V. In the cooling zone the beds are subjected to countercurrent flow. In the course thereof the beds are cooled to about 120° C. before the lowermost bed is transferred by opening the grid by means of the movable grid rods via the discharge aperture 9 and, with the slider 10 opened, onto the further conveyor 10a. After returning the grid rods of the lowermost grid into the closed position, the grids following in an upward direction are opened successively level by level and the partitions 11 and 11a respectively are moved to the open positions of the louver slats. The flaps 13 as well in the grid-shaped inserts 12 are all moved to the open position such that the beds may successively pass unhibitedly in the form of a trickle flow onto the next following grid where they once again for a bed of uniform bed thickness right across. Once the fowarding of the bed onto the next following grid has been completed, the partitions 11 and 11a are returned to their closed positions by pivoting the flaps and the flaps 13 in the grid-shaped inserts 12 are moved to the respective position desired for the particular stage of the process in the pyrolysis zone, depending on whether a partial movement of the granulates in the beds prevailing in that zone is desired or not.

The uppermost grid which has been rendered empty by the movement of the bed is charged once again by the feeding of the contents of the mold box 8 which in the meantime has been filled with a bed from the metering device 7, the feeding of the bed from the mold box 8 proceeding in the same manner as described in the context of the remaining grids 2 in the shaft 1.

In the pyrolysis zone two beds are subjected successively in countercurrent to a flow of pyrolysis gas therethrough in the illustrated example. In this case the pyrolysis gases have a temperature of about 400° C. In order to reliably prevent any passage of the pyrolysis gases in an upward direction, a bed is provided below the partition 11a through which no pyrolysis gases flow and which serves as a blocking bed.

The beds in the pyrolysis zone are subjected to a flow therethrough for a duration of two residence periods and hence pass into the heating zone II in which in accordance with the example they are once again subjected to a flow therethrough for two residence periods. However, in that case the flow therethrough on the two grids there provided proceeds in opposite directions. In the heating zone the beds are subjected to a flow therethrough of an inert gas composed of steam and $CO_2$ at a temperature of 900° C.

In the subsequent activation zone four grids are provided in the example such that the beds are there subjected to a flow therethrough of activating gas during four periods of residence, once again in alternating directions from one stage to the next. In this case the activating gas feed has a temperature of about 950° C. The reaction gas emerging from the activating zone which due to the chemical reaction is produced in a larger volume than that of the activating gas feed, may as an alternative to what is illustrated in FIG. 1 be passed into the circuit of the heating zone in order to at least partly provide the gas supply required there.

The subsequent post-treatment zone IV once again provides that the beds are post-treated at four levels, i.e. spending four periods of residence in that zone, the beds from one level to the next being subjected to flows therethrough in opposite directions, more particularly by a post-treatment gas at a temperature of about 800° C.

Cooling of the beds follows at two levels by means of injected water as described further above. In this context provision is made for the spray device 33 to be provided above the lowermost bed in the cooling zone, such that the steam generated in that zone is heated by being passed in countercurrent through the bed which is uppermost in the cooling zone prior to its being discharged by way of the duct D into the above described preceding zones.

The black coal to be used for the manufacture of the granulates to be activated in the shaft can be pretreated in a known manner by extraction or oxidation. Its treatment after the activation in the post-treatment zone is possible with widely different gases or gas compositions and also at widely varying temperatures depending on the subsequently intended use of the activated coke particles.

In all stages of the shaft according to FIG. 1 an intensive flow of gas passes through the beds, more particularly in each case in a direction normal to the plane of the bed, the feeding and discharge of the gases through the free interspaces provided between the beds assuring a uniform feeding to and from the beds over their cross sections. Abrasion of the granulates during the treatment in the above described manner is exceptionally low, because the granulates are not subjected to major static pressure and need not move while under such pressure as is the case with continuous beds or material columns.

Due to the intensive flow through the beds of the individual gases and as a result of the intensive and uniform exposure to flow of all individual granulates of the beds, there result exceptionally low reaction periods and correspondingly low residence periods. In this context the gas compositions, their temperatures and also the flow velocities in the individual zones can be varied within wide limits and be adapted to the particular requirements for attaining a particularly high effectivity.

From the aforegoing it will be apparent that by judiciously and skilfully applying the teachings of the present invention it is possible to provide a process of the type described in the introduction in which the stated drawbacks are avoided or mitigated and in which all granulates are subjected to uniform effects and flow exposure combined with a favourable aerodynamic effectiveness, i.e. a favorable ratio of transferred output to applied mechanical input.

We claim:

1. A method of making active form coke from coal, comprising the steps of:
   (a) granulating coal particles with a binder to form a granulate comprising granules of a particle size of substantially 6 to 25 mm;
   (b) passing said granulate downwardly through a reactor shaft having a plurality of vertically spaced bar grates therein formed with a plurality of bars lying in respective horizontal grate planes by:
      (b$_1$) depositing said granules in layers of uniform thickness on said bar grates over substantially the entire cross section of the shaft so that said layers form respective beds and above each layer a free space is provided, and
      (b$_2$) displacing, after a respective treatment time for the granules on each grate, at least a portion of the bars of each respective grate out of the respective grate plane to permit the granules on the respective grate to trickle uniformly through an underlying one of said free spaces onto a next-lower-lying grate and reform a layer of uniform thickness thereon over substantially the entire cross section of the shaft beginning from a lower grate and then succeedingly higher grates, thereby causing said granulate to pass in succession through a preheating and pyrolysis zone, a heating zone and aftertreatment zone and a cooling zone of said shaft and effecting pyrolysis of the granules to transform them into active form coke, each of said zones having at least one of said grates;
   (c) in each of said preheating, heating and aftertreatment zones passing a gas selected from the group which consists of $CO_2$ and steam through the respective bed generally perpendicular to the respective grate plane by laterally introducing the gas into said shaft in a free space on one side of the respective bed and laterally withdrawing the gas from a free space on an opposite side of the respective bed after it has traversed the said bed;
   (d) spraying water on said granules on at least one of said grates in said cooling zone; and
   (e) partially shielding at least one of said beds in at least one of said zones against passage of said gas therethrough until a granule-loosening threshold has been reached in a portion of the partially shielded bed through which the gas continues to pass and thereafter permitting the gas to pass through the previously shielded portion of the bed.

2. The method defined in claim 1 wherein said gas is passed through at least one of said beds formed on at least one of said grates in said pyrolysis zone upwardly in counterflow to the direction in which said granules pass through said reactor shaft.

3. The method defined in claim 1 wherein the gas is passed upwardly through the bed which is partially shielded and the partially shielded bed lies in the pyrolysis zone.

4. The method defined in claim 1 wherein the heating and aftertreatment zones include a plurality of bar grates having beds formed thereon and the gas is passed upwardly through some of said beds in said heating and aftertreatment zones and downwardly through others of said beds in said heating and aftertreatment zones.

5. The method defined in claim 1 wherein steam is generated in step (d) by spraying water on said granules in said cooling zone and the steam thus produced is then passed through a respective bed in at least one other of said zones.

6. The method defined in claim 1, further comprising the step of distributing gas flow during step (c) through at least one of said beds by selectively opening and closing flaps underlying said at least one of said beds after trickling therefrom in step (b) has ceased.

7. A method of making active form coke from coal, comprising the steps of:
   (a) granulating coal particles with a binder to form a granulate comprising granules of a particle size of substantially 6 to 25 mm;
   (b) passing said granulate downwardly through a reactor shaft having a plurality of vertically spaced bar grates therein formed with a plurality of bars lying in respective horizontal grate planes by:
      (b$_1$) depositing said granules in layers of uniform thickness on said bar grates over substantially the entire cross section of the shaft so that said layers form respective beds and above each layer a free space is provided, and
      (b$_2$) displacing, after a respective treatment time for the granules on each grate, at least a portion of the bars of each respective grate out of the respective grate plane to permit the granules on the respective grate to trickle uniformly through an underlying one of said free spaces onto a next-lower-lying grate and reform a layer of uniform thickness thereon over substantially the entire cross section of the shaft beginning from a lower grate and then succeedingly higher grates, thereby causing said granulate to pass in succession through a preheating and pyrolysis zone, a heating zone and aftertreatment zone and a cooling zone of said shaft and effecting pyrolysis of the granules to transform them into active form coke, each of said zones having at least one of said grates;
   (c) in each of said preheating, heating and aftertreatment zones passing a gas selected from the group which consists of $CO_2$ and steam through the respective bed generally perpendicular to the respective grate plane by laterally introducing the gas into said shaft in a free space on one side of the respective bed and laterally withdrawing the gas from a free space on an opposite side of the respective bed after it has traversed the said bed; and
   (d) spraying water on said granules on at least one of said grates in said cooling zone, said portion of the bar of each grate being displaced out of the respective grate plane by lifting them above others of the bars of the respective grate which remain in said grate plane.

8. The method defined in claim 7 wherein said gas is passed through at least one of said beds (on at least one of said grates) in said pyrolysis zone upwardly in counterflow to the direction in which said granules pass through said reactor shaft.

9. The method defined in claim 7 wherein the heating and aftertreatment zones include a plurality of bar grates having beds formed thereon and the gas is passed upwardly through some of said beds in said heating and aftertreatment zones and downwardly through others of said beds in said heating and aftertreatment zones.

10. The method defined in claim 7 wherein steam is generated in step (d) by spraying water on said granules in said cooling zone and the steam thus produced is then passed through a respective bed in at least one other of said zones.

11. The method defined in claim 7, further comprising the step of distributing gas flow during step (c) through at least one of said beds by selectively opening and closing flaps underlying said at least one of said beds after trickling therefrom in step (b) has ceased.

* * * * *